Nov. 8, 1960 E. SZYMALAK 2,959,457
DEVICE FOR REGREASING BEARINGS
Filed Jan. 2, 1959
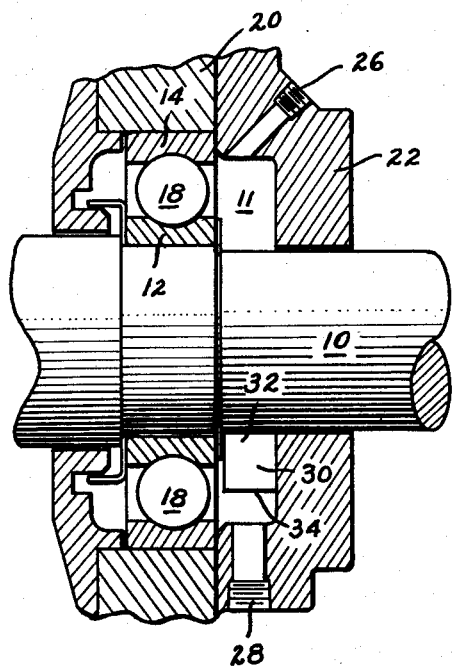
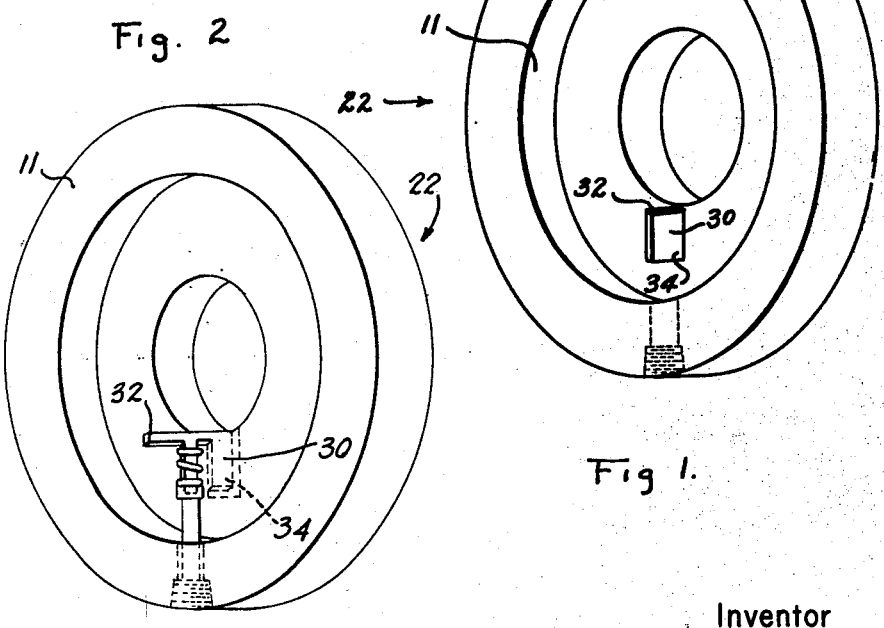
Inventor
Edward Szymalak
by James R. Campbell
His Attorney

2,959,457
DEVICE FOR REGREASING BEARINGS

Edward Szymalak, Schenectady, N.Y., assignor to General Electric Company, a corporation of New York Filed Jan. 2, 1959, Ser. No. 784,653

5 Claims. (Cl. 308—187)

The invention described herein relates to bearings and more particularly to an improved construction for purging old grease from a bearing and for establishing a predetermined maximum amount therein upon completion of a regreasing process.

In most rotating equipment, a small clearance in the order of 10–15 mils exists between the shaft and the housing for providing anti-friction movement and for preventing ingress of foreign particles into the machine during operation. Where the equipment is of a size permitting use of any one of several types of roller bearings, the grease used for lubrication purposes normally forms a channel having walls in the bearing cavity which are mirror images of the bearing components. Since the grease is in a highly viscous state, it usually does not migrate through the clearance and along the shaft length unless the bearing runs hot or is operated in high temperature environments. However, when the old grease must be renewed with new, a slight pressure is needed in the bearing cavity to cause the new grease to purge the bearing and since an avenue is available along the axial length of the shaft, as represented by the 10–15 mil clearance, some of the grease takes the path of least resistance in both directions from the bearing and respectively enters the operating parts of the machine and oozes in a direction outwardly where it hangs up on the housing. When the grease engages the operating parts, it is thrown into engagement with the rotating elements, and in the case a dynamoelectric machine, adheres to the coil end turn surfaces and causes deterioration of the insulation and/or otherwise causes the motor to run hot as a result of inadequate heat dissipation.

To overcome these disadvantages, prior art constructions suggest the use of shoulders in the clearance between the shaft and housing for restricting axial movement of grease along the shaft, but this does not represent a satisfactory solution to the problem because access to the inner parts of the machine still exists and also because the time and effort required for forming such shoulders or labyrinth seals involves expensive construction. Packing glands and rubber seals also have been used but they require constant maintenance and eventually wear during use. Shaft mounted elements have been employed for purging the bearing of grease and although these have been successful to some degree, an unusually large opening is needed in the bottom of the housing to assure complete flushing of the old grease from the bearing cavity. Not only is this undesirable from a cleanliness standpoint but an excessive amount of new grease is required to effectively regrease the bearing.

An object of my invention therefore is to provide a construction capable of efficiently purging an anti-friction bearing of old grease during a regreasing process.

Another object of my invention is to provide a bearing construction capable of automatically establishing an optimum amount of grease in the bearing cavity when old lubricant is replaced with new.

In carrying out my invention, I provide a substantially square-shaped deflector located in the bearing cavity and welded or otherwise affixed to the housing so that it extends in a direction radially of the shaft. An inner end of the deflector is positioned in close proximity to the shaft while the other end terminates at a point adjacent the outer race of a ball bearing, the whole deflector being in radial alignment with an outlet provided in the machine housing. In order to provide for introduction and removal of grease in the bearing, the inlet and outlet openings preferably are disposed oppositely from each other in the housing. When the grease is introduced in the housing, it is circulated circumferentially around the bearing because of contact with the shaft, and in so doing, infiltrates the remote areas of the ball bearing races and cages. All of the grease moves with a slow velocity, with maximum speed of movement taking place near the shaft surface, until it strikes the deflector and is guided and discharged radially outwardly through the outlet. Although the deflector is designed to effectively purge the bearing of grease, it also is chosen of a size to leave an optimum amount of lubricant in the bearing cavity.

While the specification concludes with claims particularly pointing out and distinctly claiming the subject matter which I regard as my invention, it is believed the invention will be better understood from the following description taken in connection with the accompanying drawing in which:

Figure 1 is a perspective view of an end cap illustrating the disposition of the deflector therein;

Figure 2 is a view in elevation, partly in section, showing how the deflector is effective in purging the bearing cavity of grease; and Figure 3 is a perspective view of a modification illustrating means for biasing the deflector towards the shaft opening in the end cap.

Referring now to the drawing wherein like reference characters designate like or corresponding parts throughout several views, there is shown in Figures 1 and 2 a shaft 10 for a machine, such as a motor or generator, engine, air compressor, or other rotating equipment requiring grease lubricated bearings for operation. The bearing illustrated is enclosed in a bearing cavity 11 and comprises a conventional ball bearing having inner and outer races 12 and 14 and a cage for holding the balls 18 in a fixed position relative to each other. As in the usual construction, the inner race is secured for rotation with the shaft 10 while the outer race is immovably anchored in the housing 20 or other part attached to the frame of the machine. A removable end cap 22 is attached to the housing by bolts, not shown, and a clearance in the neighborhood of 10–15 mils is provided radially between the shaft and housing on opposite sides of the bearing. The bearing is grease lubricated and appropriate inlet and outlet openings 26 and 28 are located respectively in the housing above and below the bearing to provide for supply and discharge of grease. Such openings usually take the form bored passageways which are closed by caps in the usual manner.

In order to assure that the bearing cavity is furnished with the correct amount of grease and that the bearing can be purged effectively of old grease, a deflector 30 is welded, cast integrally, or otherwise affixed to the inner side of end cap 22. The deflector is of rectangular configuration and is positioned in radial alignment between the shaft and outlet 28 in the housing. One end 32 thereof is positioned within a few mils of the shaft while the other end 34 terminates at a point substantially midway of the radial length of the bearing as shown. An alternative construction envisions movably mounting the deflector in the housing and urging it into contact with the shaft by springs or other biasing elements.

During normal operation, with the bearing cavity filled with the desired amount of grease, the bearing components form a channel in the grease corresponding to their configuration. The grease moves in a circumferential pattern at an exceedingly low speed, and in ordinary temperatures, furnishes the operating parts with the necessary lubrication. The grease however gathers foreign particles and must be renewed after a predetermined time, depending on the environment in which the machine operates.

When it is desired to regrease the bearing and thereby replace old grease with new, the caps covering the grease inlet and outlet are removed and grease is forced into the bearing cavity under a pressure. With the shaft rotating in either direction at approximately 1800 r.p.m., for example, all of the grease commences to move very sluggishly although the grease closest to the shaft moves at approximately 5–10 r.p.m. When the bearing cavity is approximately full, the balls of the bearing become restricted in movement and the whole mass of grease moves as a unit. When this occurs, the pressure is just about sufficient to cause displacement of the grease along the axial length of the shaft. However, the grease will strike the deflector and be diverted radially outwardly through the outlet. All of the grease is not immediately removed and a portion of it continues to move as a mass circumferentially in the bearing cavity. Continued movement, with corresponding introduction of new grease imparts additional velocity to it and eventually purges the bearing of all of the old grease. As is apparent, purging is accomplished by causing the new grease to mingle thoroughly with the old as it infiltrates the various void spaces surrounding the parts of the bearing. In the usual case when grease is added to a bearing where the shaft is rotating at 1800 r.p.m., it takes approximately 5 seconds to completely purge the bearing of old grease after the whole mass starts to move in the bearing cavity. The complete operation however involves approximately two minutes.

To illustrate the effectiveness of this invention a 6.69" ball bearing was charged with and operated in grease. During regreasing, 360 grams of grease was pumped into the bearing cavity and the bearing completely purged of old grease. It was found that only one gram leaked along the shaft toward the machine while none leaked through the outside seal. In the normal regreasing process in machines not having this invention, 100 grams consistently leaked along the length of the shaft and through the shaft clearance.

The deflector serves a dual function since it is used as a guide for directing grease out of the bearing during the purging operation while also serving as a means for controlling the amount of remaining grease in the bearing cavity. As previously indicated all of the lubricant is not discharged through the outlet because a certain amount will adhere to the bearing components and be circulated within the cavity. The deflector is specifically designed to permit such circulation and the amount of grease remaining equals an optimum amount necessary for lubrication purposes.

Preferably, the deflector should extend approximately one half the distance between the shaft and the outlet, thus terminating at about the center of the balls of the bearing. The exact termination is not critical but if the deflector is made too long, it will block the exit opening and present an impediment to flow of grease therethrough. If the deflector is too short, its effectiveness diminishes because the grease will continue circulating as a whole mass in the bearing cavity with only a very small portion being extruded from the outlet opening. Obviously, many different sizes of deflectors can be used depending on the size of the machine and its associated bearings.

It will be apparent that many different modifications of the deflector and its position in the bearing cavity can be resorted to and still fall within the scope of this invention. For example, the deflector can be made of V-shape configuration where the bottom of the V would be pointing towards the exit opening. The deflector also may assume a curvilinear configuration so long as the design is capable of purging the bearing of grease and still maintain the desired amount in the bearing for proper operation. As previously indicated, the deflector can be positioned at any one of a number of points around the bearing cavity so long as the outlet is in alignment with it. In some instances, it may be desirable to support and position the deflector independent of the housing in order to achieve a particular type of purging action.

It therefore will be evident that many modifications and variations are possible in light of the above teachings. It therefore is to be understood that within the scope of the appended claims the invention may be practiced other than as specifically described.

What I claim as new and desire to secure by United States Letters Patent is:

1. An anti-friction bearing arrangement for a machine comprising a shaft and housing forming a bearing cavity, a bearing including inner and outer races and balls positioned in the bearing cavity and fixed between said shaft and housing for providing anti-friction operation for the machine, a lubricant inlet and outlet communicating with said bearing cavity, and guide means positioned in said cavity and attached to said housing for directing lubricant out of the bearing cavity during a regreasing operation, said guide means being located sufficiently close to the lubricant outlet so that during said regreasing operation, lubricant striking the guide means is deflected directly outwardly toward said outlet for discharge from the bearing cavity.

2. An anti-friction bearing arrangement for a machine comprising a shaft and housing forming a bearing cavity, a bearing including inner and outer races and balls positioned in the bearing cavity and fixed between said shaft and housing for providing anti-friction operation for the machine, and a deflector in the bearing cavity and attached to said housing, said deflector being in radial alignment with the shaft and said outlet and of a length sufficient to divert grease from the bearing cavity through the outlet when grease is supplied through the lubricant outlet.

3. An anti-friction bearing arrangement for a machine comprising a shaft and housing forming a bearing cavity, a bearing including inner and outer races and balls positioned in the bearing cavity and fixed between said shaft and housing for providing anti-friction operation for the machine, and a deflector in the bearing cavity and attached to said housing, said deflector being in radial alignment with the shaft in said outlet and having one end adjacent the shaft and the other end terminating at approximately the center of the balls in the bearing for diverting grease from the bearing cavity through the outlet when grease is supplied through the inlet during a regreasing operation.

4. The combination according to claim 3 wherein said deflector is movably mounted in said housing and spring biased into engagement with said shaft.

5. An anti-friction bearing arrangement for a machine comprising a shaft and housing forming a bearing cavity, a bearing including inner and outer races and balls positioned in the bearing cavity and fixed between said shaft and housing for providing anti-friction operation for the machine, and a combined deflector and a grease control arrangement mounted in the bearing cavity and in radial alignment with the shaft and lubricant outlet, said combined deflector and control arrangement being of a length sufficient to purge the bearing cavity of grease when new grease is added but still small enough to permit an optimum amount of grease to remain in the bearing for lubrication purposes.

References Cited in the file of this patent

UNITED STATES PATENTS 2,164,449     Delaval-Crow     July 4, 1939